Figure 1:
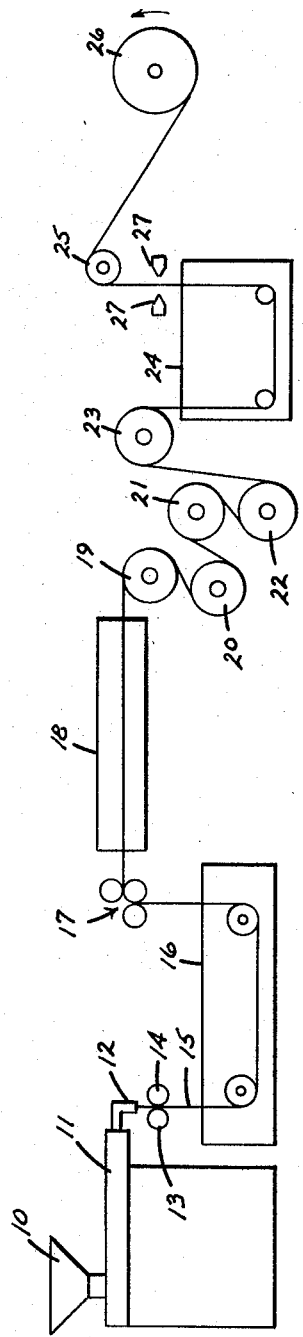

June 6, 1967    J. J. ARMSTRONG ET AL    3,324,217

METHOD OF MAKING A POLYPROPYLENE BINDING STRAP

Filed Feb. 25, 1963

3,324,217
METHOD OF MAKING A POLYPROPYLENE BINDING STRAP
John J. Armstrong, Pennsauken, N.J., and Harold W. Wyckoff, Media, Pa., assignors, by mesne assignments, to FMC Corporation, San Jose, Calif., a corporation of Delaware
Filed Feb. 25, 1963, Ser. No. 260,783
3 Claims. (Cl. 264—210)

This invention relates to an improved high strength binding strap and to an in-line, continuous method of making the same. More particularly, the invention is directed toward a binding strap having an exceptionally high energy to break and especially to such a strap formed of polypropylene.

The strap of the present invention is useful for banding, bundling and unitizing boxes, packages and other articles as well as for reinforcement of paper and the like and, in fact, finds application in many fields now or previously employing steel bands, wire, rope or the like, but it is particularly adapted to serve as an improved substitute for steel band strapping.

As is well recognized, steel band strapping is characterized by high tensile strength and low elongation and while these characteristics are probably the prime prerequisites for certain applications, other applications can be best served by a strap having other or additional characteristics. When steel bands are employed to secure together a group of articles such as boxes, the bands, even though possessing high tensile strength, are apt to snap under the shock loading imposed thereon if the banded group of articles is dropped, the snapping being caused by the limited amount of elongation of which the strap is capable and, consequently, the limited amount of energy it is capable of absorbing. The energy to break the usual commercial grades of steel band strapping having a nominal tensile strength of 100,000 pounds per square inch and an elongation of two and one-half to three percent is below about 3,000 inch pounds per cubic inch. Furthermore, when steel bands are employed for bundling a group of articles, prolonged jiggling of the articles during transportation by train or truck causes the bands to stretch somewhat and thereby loosen, and the steel bands are not capable of recovering this stretch, so as a consequence they remain permanently loose. Another characteristic of steel band strapping is that it rusts and this has limited its useful life under exposed conditions.

It is an object of the present invention to provide a binding strap having an energy to break which is substantially higher than steel band strapping, a controlled amount of extensibility, adequate tensile strength and which is light weight, rust-proof and inexpensive.

A more specific object of the invention is to provide a binding strap formed of oriented polypropylene having the above characteristics.

Another object of the invention is to provide an in-line, continuous method of making such a binding strap.

Figure 2:
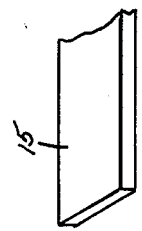

Referring now to the drawing:

FIG. 1 is a diagrammatic side elevational view of apparatus useful for carrying out the method of this invention; and FIG. 2 is a perspective view of a portion of a strap made in accordance with the invention.

In accordance with the present invention, pellets of polypropylene resin having a density of between about 0.9 and about 0.915 gram per cubic centimeter and a melt index of below 1.0 and preferably between 0.7 and 0.8 are dumped into a hopper 10 of an extruder 11 from which the resin is extruded in a downward direction through a substantially rectangular orifice of the discharge nozzle 12 of the extruder. The material discharged by the extruder is immediately passed between a pair of cold quenching and sizing rolls 13 and 14 which are preferably maintained at a temperature of approximately 45° F. so as to rapidly chill the exterior of the extruded material which is in the form of a strap or ribbon 15. Rolls 13 and 14 are formed of metal and are smooth-surfaced and spaced apart in accordance with the desired thickness of the strap. The distance between rolls 13 and 14 is not the same as the final thickness of the strap but bears a predetermined relationship to the final thickness and these rolls materially aid in providing a strap of uniform thickness inasmuch as without the pressing action of the rolls the strap would be thicker in the middle than at the edges if the orifice through which the resin was extruded were truly rectangular.

After leaving rolls 13 and 14, the strap is led through a quenching tank 16 containing water at a temperature of about 90° F. to effect a cooling of the interior of the strap. This further cooling is essential to obtain the desired crystalline structure as the resin hardens. The strap is drawn from the quenching tank 16 by a set of rolls 17 from whence it is passed through a heater 18 wherein the strap is re-heated to a temperature of between about 140° F. and 300° F., preferably between about 180° F. and 230° F. Heater 18 may comprise a plurality of infrared lamps or may be of the gas type. The structure of the heater is not particularly important and a rather wide temperature range is permissible, the main purpose in heating the strap at this time being to facilitate the drawing or stretching operation which takes place after the strap leaves the heater.

After passing through the heater, the strap passes over a drum 19 and about a drum 20, both of which are maintained at a temperature of about 260° F., and serve to closely control the temperature of the strap as it passes thereabout. From drum 20 the strap passes to drum 21 and from thence to a drum 22. Drums 21 and 22 are maintained at about 45° F. and these two drums are rotated at a higher speed than drums 19 and 20 whereby the strap is stretched between drums 20 and 21, said strap being snubbed on the slow side by drums 19 and 20 and on the fast side by drums 21 and 22. The stretching or drawing of the strap is carried out at a draw ratio of between 6 and 12, preferably about 8. The term "draw ratio" is used to designate the increased length of the strap. Thus, a draw ratio of 8 indicates that the strap is eight times as long after stretching as before. It is primarily the draw ratio that determines the orientation of the molecular segments of the resin forming the strap and at a draw ratio of 8 about 60% of the molecular segments are oriented within 10 degrees of the longitudinal axis of the strap. Higher draw ratios will result in greater longitudinal orientation of the molecules and will increase the tensile strength of the strap but at the same time the higher ratio will result in a strap of lower elongation and to obtain optimum balance between tensile strength and elongation so as to provide the desired high energy to break a draw ratio of about 8 has been found to be the most suitable. For providing desirable toughness, at least 20% of the molecular segments of the resin should be oriented at random. Draw ratios below about 8 produce a lower tensile strength and greater elongation.

After leaving drum 22, the strap is completely manufactured but before winding into a roll it should be cooled to prevent the rolling operation from imparting a permanent coiled effect upon the strap and to prevent the convolutions of the strap from sticking to one another. Therefore, after leaving drum 22, the strap is led over a drum 23 maintained at a temperature of about 45° F.

and from said drum the strap is passed through a chill tank 24 containing water at about 45° F. from which the strap is directed over a guide roll 25 and onto a rotating wind-up reel 26. Desirably, air is directed onto the strap through nozzles 27 as the strap leaves the quenching tank in order to dry the same.

The above-described apparatus is located in a single straight line from hopper 10 to wind-up reel 26 and the process is a continuous one with pellets either supplied to the hopper automatically or manually.

While all the variables of the above process such as the melt index and density of the resin, temperatures, and draw ratios have an effect upon the physical properties of the strap, a strap manufactured within the above parameters will have a tensile strength of between about 55,000 and about 80,000 pounds per square inch, an elongation of between about 12 percent and about 20 percent and an energy to break of between about 3,500 inch pounds per cubic inch and about 7,500 inch pounds per cubic inch. At a draw ratio of 8, at least 60 percent of the molecular segments of the strap were oriented within 10° of the longitudinal axis of the strap and at least 20 percent of the molecular segments were oriented at random to thereby provide toughness. Ideally, the strap thickness should be between about 10 mils and about 40 mils, a 20 mil thickness having been found suitable for employment in the fields normally served by steel band strapping. Strap widths will normally vary between ¼ inch and 3 inches. At a draw ratio of 8, the elongation is about 15 percent and the tensile strength about 60,000 pounds per square inch, these figures being determined by standard tests on an Instron Tensile Testing Machine. The hereinbefore referred to "energy to break" was also determined on an Instron Tensile Testing Machine and represents the area under the stress-strain curve. A strap 20 mils thick and ⅝ inch wide required an actual energy to break of 65.9 inch pounds per inch and when this figure is converted to inch pounds per cubic inch the figure is 5,280. A comparable width commercially available steel strap 15 mils thick had an energy to break as determined on the Instron Tensile Testing Machine of 29.51 inch pounds per square inch and this works out to 2,753 inch pounds per cubic inch.

Thus, it will be seen that the polypropylene strap of the present invention while having a lower tensile strength than steel band strapping has, as a result of its greater elongation, a substantially higher energy to break than steel band strapping. As previously pointed out, there are many strapping operations wherein the energy to break is of far more importance than the actual tensile strength. Of course, relatively high tensile strength is normally essential and at a tensile strength of 60,000 pounds per square inch, the strap of the present invention is ideally suited for a wide variety of uses. When the strap is used for securing a group of packages together, it will stretch somewhat under the constant jiggling of the packages during transportation but then will shrink back to its original length when the packages are brought to rest. As previously mentioned, steel strap under similar conditions will stretch but will not return to its original length and, consequently, becomes permanently loosened. When a group of packages are bound together, a considerable amount of energy is exerted against the binding if the packages are dropped and shift their relative positions. Since the strap of the present invention is capable of absorbing considerably more breaking energy than steel strapping, it will readily be appreciated that the present strap is superior to steel for this purpose. As previously mentioned, the present strap is also unaffected by moisture and will not rust.

Having thus described the invention, what is claimed is:

1. An in-line method of making a binding strap comprising the steps of extruding through a substantially rectangular orifice a polypropylene resin having a melt index below 1.0 and a density of between 0.9 and 0.915, simultaneously quenching and sizing the extruded strap by passing it between and in pressure contact with a pair of cold rolls maintained at approximately 45° F. to provide rapid chilling of the surface of the strap, passing the strap through a water bath maintained at about 90° F., heating the strap to a temperature of between about 180° F. and 230° F., drawing the heated strap at a draw ratio of between 6 and 12, chilling the drawn strap, and winding the strap into a roll.

2. The method set forth in claim 1 wherein the melt index of the resin is between about 0.7 and 0.8.

3. The method set forth in claim 2 wherein the draw ratio is about 8.

References Cited

UNITED STATES PATENTS

| | | | |
|---|---|---|---|
| 2,728,951 | 1/1956 | O'Hanlon et al. | 264—178 |
| 2,923,966 | 2/1960 | Tooke et al. | |
| 2,979,774 | 4/1961 | Rusignolo | 264—210 |
| 2,995,779 | 8/1961 | Winter | 264—210 |
| 3,104,937 | 9/1963 | Wyckoff et al. | |
| 3,146,284 | 8/1964 | Markwood | 264—210 |
| 3,217,073 | 11/1965 | Olson et al. | 264—210 |

ALEXANDER H. BRODMERKEL, *Primary Examiner.*

D. J. ARNOLD, *Assistant Examiner.*